Figure 1:
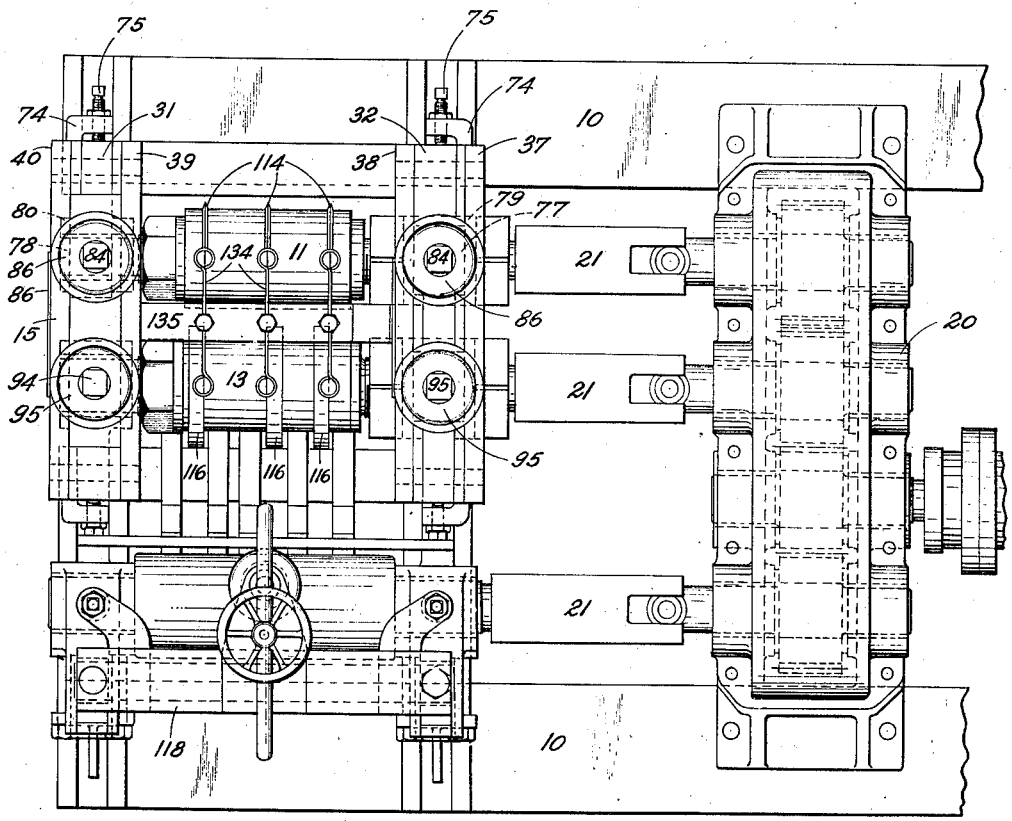

March 1, 1938.　　　W. W. LEACH　　　2,109,921
METHOD AND MACHINE FOR SLITTING METAL
Filed Jan. 18, 1936　　　3 Sheets-Sheet 1

Inventor
WILLIAM W. LEACH
Attorneys

March 1, 1938.  W. W. LEACH  2,109,921
METHOD AND MACHINE FOR SLITTING METAL
Filed Jan. 18, 1936  3 Sheets-Sheet 2
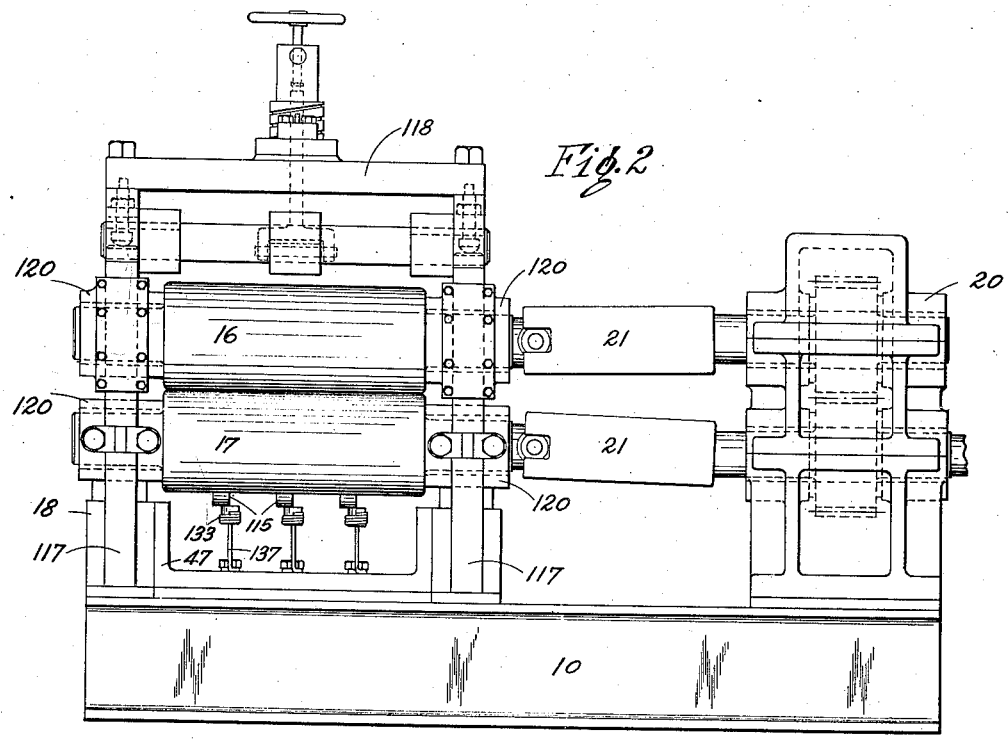
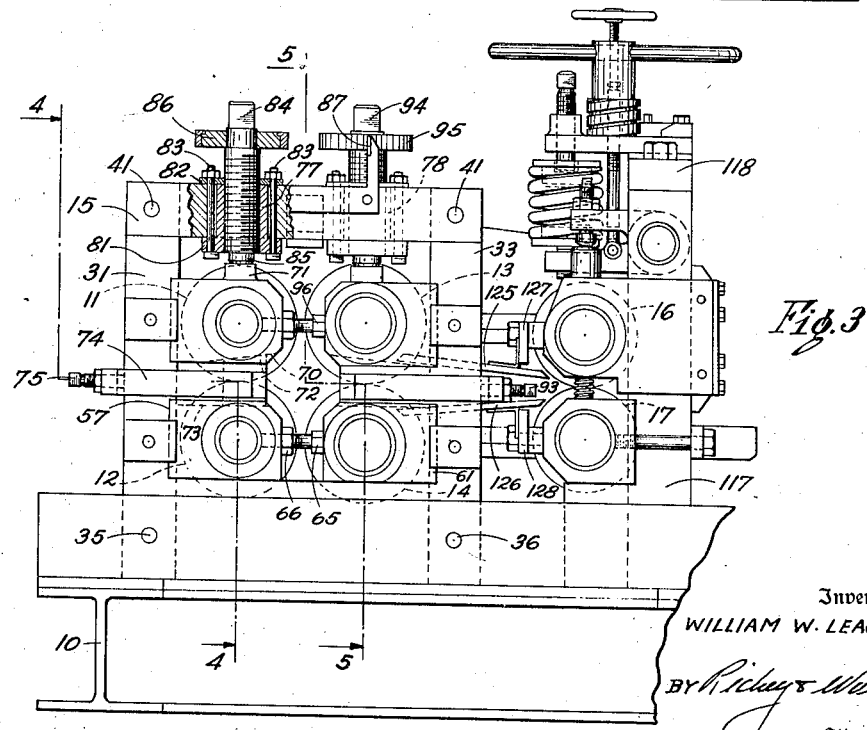
Inventor
WILLIAM W. LEACH
By Richey & Watts
Attorneys March 1, 1938. W. W. LEACH 2,109,921
METHOD AND MACHINE FOR SLITTING METAL
Filed Jan. 18, 1936 3 Sheets-Sheet 3

Inventor
WILLIAM W. LEACH
Attorneys

Patented Mar. 1, 1938

2,109,921

UNITED STATES PATENT OFFICE 2,109,921

METHOD AND MACHINE FOR SLITTING METAL

William W. Leach, Warren, Ohio, assignor to The Aetna-Standard Engineering Company, Youngstown, Ohio, a corporation of Ohio Application January 18, 1936, Serial No. 59,700

11 Claims. (Cl. 164—17)

This invention relates to a method of and apparatus for cutting sheet material into strips and more particularly to a method of and apparatus for slitting steel sheets or strips into narrower strips.

In the production of narrow strips of steel for various purposes, it is more economical originally to roll the steel in a sheet or strip of considerable width and thereafter slit the wide strip into a plurality of strips of the desired width than to originally roll narrow strips. Slitting machines for carrying out this operation are well known and have heretofore comprised opposed shearing rolls having a plurality of substantially cylindrical knives on each roll. The sheets are passed between the rolls and the cylindrical knives shear the metal into the desired number of strips. Ordinarily the shearing rolls are driven and the sheared material is drawn from between the rolls by a set of pinch rolls through which the sheared strips pass after passing between the shearing rolls.

Machines of this type have been used to a considerable extent but they are open to serious objections in that the shearing operation produces a rough edge and leaves a burr on the sheared strips. Thus for many uses it is necessary to subject the edges of the strips to a grinding operation or some similar operation in order to produce edges sufficiently smooth for the purposes for which the strips are intended. Furthermore the shearing knives must be set very accurately and as the edges of the knives on the upper roll overlap the edges of the knives on the lower roll, the result is that the knives wear rapidly. The prior types of machines are also incapable of cutting long strips and maintaining the width of the narrower strips accurately because the action of the shearing knives pulls the metal of the original strip inwardly toward the center of the rolls, resulting in the production of narrower strips from the edge portions of the original strip and wider strips from the center portion of the original strip.

It is therefore among the objects of my invention to provide a method and apparatus for slitting strips of material whereby the above mentioned difficulties are eliminated and whereby a wide strip can be accurately cut into narrower strips having smooth edges substantially free from burrs. Another object of my invention is to provide a simple and sturdy machine for slitting strips of material into narrower strips. Another object of my invention is to provide a machine wherein the wear on the cutting tools is greatly reduced as compared to prior practices. Another object is to provide a method and machine whereby the width of the strips cut by the machine can be accurately maintained. Another object of my invention is to provide as an article of manufacture a cut strip of sheet metal having a smooth edge substantially free from burrs.

Further objects and advantages of my invention will become apparent from the following description of a preferred form thereof. The essential characteristics are summarized in the claims.

According to a preferred form of my method, I pass the strip of sheet steel or other material to be cut first between a set of rolls carrying sharp-edged V-shaped cutting knives arranged so that the edges of the knives are directly above one another and spaced so that the knives score the material to be cut and produce oppositely disposed aligned grooves in the surfaces of the material extending inwardly toward each other but not of sufficient depth completely to sever the metal. Thereafter the scored strip is passed between shearing rolls having cylindrical knives which engage the surfaces of the material on opposite sides of the grooves formed by the scoring rolls and exert a shearing force on the material which severs the part of the material which was not severed by the scoring rolls. The shearing rolls do not overlap, but are set so as to displace the material on the other side of the scored grooves to a sufficient extent to insure the complete severing of the original strip into narrower strips. As the scoring rolls do not completely sever the material, the width of the strips cut by the machine can be accurately maintained, for the cut always takes place along the scored grooves which concentrate the stresses imposed by the shearing rolls on the small section of material left by the scoring rolls. This method produces a cut strip having smooth, slightly beveled edges which are substantially free from burrs.

The machine for carrying out my method preferably comprises a suitable frame in which are supported a pair of scoring rolls, a pair of shearing rolls, and a pair of pinch rolls which draw the cut material from the shearing rolls. All of the rolls are driven by suitable mechanism, and suitable means are provided for adjusting the various sets of rolls.

Figures 6, 7:
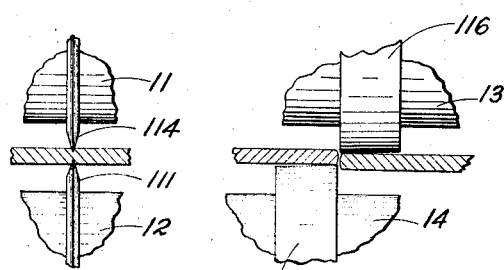
Figure 5:
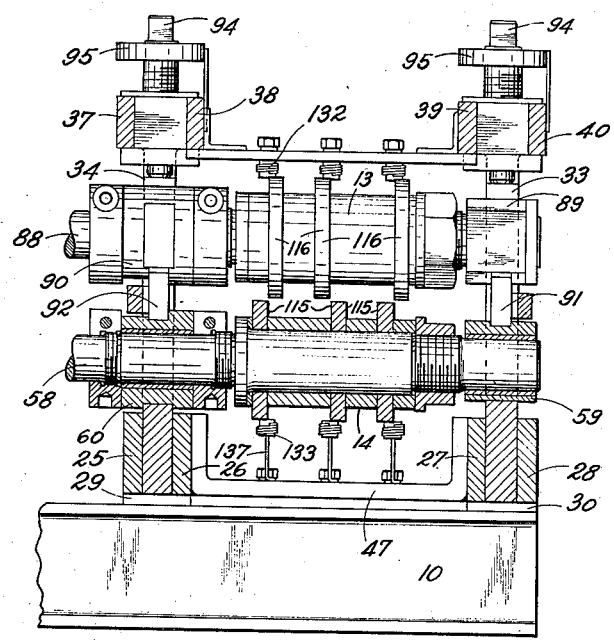
Figure 4:
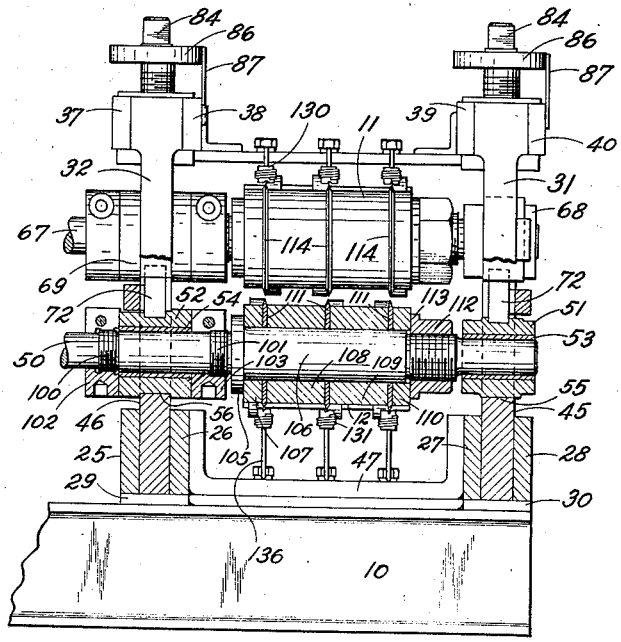

In the drawings, in which I have illustrated a preferred form of apparatus for carrying out my invention, Figure 1 is a plan view of a slitting machine made according to my invention; Figure 2 is an end elevation of the machine shown in Figure 1 illustrating the pinch rolls and the driving connections; Figure 3 is a side elevation, partially in section; Figure 4 is a section taken along the line 4—4 of Figure 3, and illustrating the scoring rolls; Figure 5 is a section taken along line 5—5 of Figure 3, illustrating the shearing rolls; and Figures 6 and 7 are diagrammatic illustrations on an enlarged scale showing the cutting action of the scoring and shearing rolls, respectively.

As illustrated in the drawings, the entire machine may be mounted on a suitable supporting base formed of I-beams 10. The scoring rolls 11 and 12 and the shearing rolls 13 and 14 are preferably mounted, in a manner to be hereinafter described, in a supporting framework indicated generally at 15, while the pinch rolls 16 and 17 are supported by a separate framework indicated generally at 18.

All of the rolls may be driven at substantially the same peripheral speed by an electric motor (not shown) through a conventional type of gear box indicated generally at 20 and mounted on the frame members 10, and through universal coupling members indicated diagrammatically at 21. The driving mechanism may be of any conventional design and will not be further described herein.

The supporting framework 15 for the scoring and shearing rolls may be constructed in any suitable manner but preferably comprises, as shown in the drawings, longitudinally extending pairs of rails 25, 26 and 27, 28 which may be welded or otherwise suitably secured to plates 29 and 30 resting on the I-beams 10. Upright members 31 and 32 which extend down between the rails 25, 26 and 27, 28, respectively, and rest on the plates 29 and 30, are disposed adjacent the scoring rolls 11 and 12, and similar upright members 33 and 34 are disposed in the central part of the machine adjacent the shearing rolls 13 and 14. The uprights may be secured in the plates by pins 35 and 36 and the upper ends of the upright members may be connected by pairs of longitudinally extending members 37 and 38 and 39 and 40 which may be secured thereto by pins 41. The uprights and the upper longitudinally extending members support the adjusting mechanism, while the weight of the rolls is supported by longitudinally extending plates 45 and 46 of slightly greater depth than the rails 25, 26 and 27, 28 and disposed between the pairs of rails and extending longitudinally between the upright members 31 and 33 and 32 and 34, respectively. The plates 45 and 46 are preferably welded to the rail members, and the base structure is further reinforced by a U-shaped member 47 extending transversely between the rails 26 and 27 and preferably welded thereto.

The shaft 50 for the lower scoring roll 12 may be supported by bearing blocks 51 and 52 by suitable bushings 53 and 54 having flat lower surfaces adapted to rest on the members 45 and 46 as indicated at 55 and 56 in Figure 4. To prevent axial displacement of the bearing blocks with respect to the frame structure, the flat surface 56 is preferably recessed slightly and the vertical surfaces at the ends of the bearing blocks are channeled to extend on both sides of the uprights 31 and 32 as indicated at 57 in Figure 3.

As shown particularly in Figures 3 and 5, the shaft 58 for the lower shearing roll 14 is supported by bearing blocks 59 and 60 which are generally similar to the bearing blocks 51 and 52. The bearing blocks are similarly supported on the members 45 and 46 which have vertical surfaces engaging the uprights 33 and 34 as indicated at 61.

The bearing blocks 51 and 52 for the scoring roll 12 are provided with bolts 65 and lock nuts 66, the bolt heads engaging the bearing blocks 59 and 60 for the lower shearing roll 14 so that the bolts may be adjusted to space the bearing blocks for the scoring and shearing rolls apart and urge the blocks into engagement with the upright members 31, 32, 33 and 34. In the drawings only the bolt and lock nut arrangement for the bearing blocks 51 and 59 is illustrated, but a similar arrangement is found on the opposite side of the machine for the bearing blocks 52 and 60. It will be seen that by this arrangement the lower scoring and shearing rolls are rigidly held against movement in directions either longitudinally of the machine, or axially of the rolls and transversely of the machine.

In order to provide for convenient adjustment of the upper scoring and shearing rolls with respect to the lower rolls so that the machine can accommodate different thicknesses of material and can be adjusted to meet the requirements of different conditions of operation, the shaft 67 for the upper scoring roll 11 is mounted in bearing blocks 68 and 69 which are of generally similar construction to the bearing blocks 51 and 52 except that the lower faces of the bearing blocks are cut off at an angle as illustrated at 70 in Figure 3, and the upper faces are provided with upwardly extending bosses, as shown at 71. In order to lift the bearing blocks 68 and 69 upwardly and thus space the rolls 11 and 12 farther apart, I preferably provide adjustable wedge blocks 72 mounted on opposite sides of the machine and disposed between the horizontal flat upper surfaces 73 of the lower bearing blocks and the slanting lower surfaces 70 of the upper bearing blocks. The wedge blocks may be moved outwardly (i. e., to the left in Figure 3) by means of links 74 rigidly secured to the wedge blocks and the screws 75 which are threaded in the links and which engage the upright members 31 and 32.

In order to hold the upper scoring roll down so that it will score the material to the proper depth, I have provided screw adjusting means mounted in the longitudinally extending upper frame members. This mechanism may preferably comprise internally threaded blocks 77 and 78 mounted between the frame members 37 and 38 and 39 and 40, respectively, the frame members being recessed as indicated at 79 and 80 adjacent the blocks whereby the blocks are rigidly held in position. The blocks are secured against vertical movement by flanges 81 and plates 82 and are firmly clamped in position by bolts 83. Screws 84 are mounted in the blocks and have end surfaces 85 which are adapted to engage the upwardly extending bosses on the upper bearing blocks 68 and 69. The screws are preferably provided with hand wheels 86 and if desired the wheels may bear gauges so that by means of the pointers 87 the operator can determine the spacing of the rolls.

As illustrated particularly in Figures 3 and 5, similar mechanism is employed for supporting the shaft 88 of the upper shearing roll 13, the bearing blocks 89 and 90 being movable upwardly by the wedge blocks 91 and 92 actuated by screws 93, and the spacing between the rolls being limited by screws 94 controlled by hand wheels 95. The upper shearing and scoring rolls are spaced apart and held in engagement with the upright members 31, 32, 33 and 34 by means of a bolt and lock nut arrangement indicated at 96 and which operates in the manner of the bolts and nuts 65 and 66 described with reference to the lower scoring and shearing rolls.

To provide for slight lateral adjustment of the lower scoring roll, the shaft 50 is provided with threaded portions 100 and 101 on opposite sides of the bearing block 52, and collars 102 and 103 are threaded on the portions 100 and 101, respectively. By changing the position of the collars on the shaft, the shaft and the scoring roll can be moved axially to make slight adjustments in the alignment of the machine. The collars may be retained in adjusted position by set screws or other suitable means. A similar adjustment which will not be described in detail herein is provided for the upper scoring roll and also for the upper and lower shearing rolls.

It will be seen that by my arrangement for supporting the bearings for the various shearing and scoring rolls that the spacing between the rolls can be accurately maintained and the rolls can be accurately aligned axially. By my construction the rolls can be easily replaced for when the pins 41 are removed, the upper longitudinal frame members and the screw mechanism may be lifted off bodily and then the shearing and scoring rolls can be lifted upwardly and readily removed from the machine.

To provide a convenient and economical construction for the scoring rolls whereby the cutting edges of the rolls can be readily replaced or removed for sharpening, the shaft 50 for the scoring rolls is preferably provided with an integrally formed flange 105 adjacent the bearing 52 and with a cylindrical portion 106 of slightly enlarged diameter intermediate the two bearings for the shaft. Sleeved on the cylindrical portion 106 I have provided a series of collars 107, 108, 109 and 110. The annular scoring knives 111 are mounted between adjacent surfaces of the collars, and the collars and knives are rigidly held together by means of a collar 112 threaded on the shaft and having a flange 113 for engaging the collar or sleeve 110. A similar arrangement is provided on the upper scoring roll shaft 67 for holding the knives 114 in place and, as shown particularly in Figure 5, the same general scheme is employed in the construction of the shearing rolls in order to retain the shearing knives 115 and 116 in position on the shafts 58 and 88.

It will be seen that by this construction the same shafts can be employed for cutting strips of different widths merely by varying the widths of the collars which space the scoring and shearing knives, and the knives can be made of tool steel or other suitable cutting material, while the shafts and collars can be made of less expensive material. Also, by this arrangement, the knives can be replaced easily and can be removed for sharpening with a minimum amount of trouble.

To lubricate the cutting surfaces of the scoring and shearing knives and to remove chips, grit and dirt from the surfaces of the knives, I have provided lubricating pads 130 and 131 on the upper and lower scoring rolls, respectively, 132 and 133 on the upper and lower shearing rolls, respectively. These pads may be of felt or other suitable material and are saturated with a suitable cutting oil. The pads 130 and 132 are supported by spring wire members 134 suitably mounted on a cross member 135 extending between the upper longitudinal frame members, while the lower pads 131 and 133 are similarly supported by spring wire members 136 and 137 mounted on the U-shaped reinforcing base member 47.

The pinch rolls 16 and 17, which are employed to assist in withdrawing the severed strips from the machine, may be supported by uprights 117 which are mounted between the rails 25, 26 and 27, 28. The uprights are preferably joined at their upper ends by a transverse member 118 which supports suitable mechanism for applying pressure to the pinch rolls to insure proper delivery of the material thereby. The general arrangement of this mechanism forms no part of the present invention and will not be described in detail herein as various mechanisms of this general character are well known in the art. However, in order to prevent undue wear and grooving of the pinch rolls as the result of long continued operation of the machine to cut strips of the same width, I preferably provide the pinch roll bearings 120 with lateral adjusting mechanism similar to that described in detail in conjunction with the scoring rolls and including collars 121 and 122 threaded on the shafts of the pinch rolls and engaging the end walls of the bearing blocks 120. By this means the pinch rolls can be occasionally adjusted to one side or the other to prevent localized wear on the surfaces of the rolls. In order to guide the severed sheets of material from the shearing rolls to the pinch rolls, I have provided a series of upper and lower straps or guides 125 and 126 which are supported by brackets 127 and 128 extending from the bearing blocks for the pinch rolls and which converge in the direction of travel of the material through the machine to insure proper feeding of the severed strips of material into the bite of the pinch rolls.

In operation, the scoring rolls are preferably set as illustrated on an enlarged scale in Figure 7 of the drawings with the knives 111 and 114 directly above one another and with the upper roll adjusted with relation to the lower roll by means of the wedge adjustment members 72 and the screw members 84 so that the knives 111 and 114 will form grooves on the upper and lower faces of the material being severed, the grooves preferably extending inwardly about one-third of the thickness of the material, leaving the remaining one-third of the thickness of the material intact. The shearing knives 115 and 116 are set as shown in Figure 8 of the drawings, one of the knives being disposed to engage the material at one side of the score mark produced by the scoring knives, and the other knife engaging the material on the opposite side of the score mark. It will be noted that the knives are adjusted axially so that they do not overlap in an axial direction, and they are also adjusted vertically so that they are spaced in a vertical direction a distance approximately equal to two-thirds of the thickness of the material being operated upon.

In the preferred setting of the machine, the scoring knives on the upper roll never touch the scoring knives on the lower roll, and the shearing knives on the upper roll never touch the shearing knives on the lower roll. By reason of this arrangement, the knives are long-lived and seldom require sharpening. The life of the cutting edges is further increased by the fact that the edges are continuously lubricated and are constantly cleaned to remove all chips, dirt and grit. The scoring knives function to indent smooth grooves on opposite sides of the metal, while the shearing knives displace the metal on one side of the grooves with relation to the metal on the other side of the grooves to a sufficient extent to cause the metal to break and be sheared or severed along the line of the scoring of the score marks. The scored grooves, which are accurately cut one above the other, so concentrate the stresses imposed by the shearing knives that a smooth clean sheared edge, free from any considerable roughness or burrs is readily obtained.

As an example of the work of which my machine is capable, a machine constructed substantially according to the proportions shown in the drawings and having rolls approximating 5½ inches in diameter is capable of successfully shearing material as thick as $\frac{3}{16}''$ and as light or thin as say 24 gauge. The machine will operate for long periods of time without requiring attention, cuts the steel into strips of accurate width, and may be operated steadily at speeds of say 400 feet per minute. The strips cut by my machine have smooth edges with slight bevels formed by the scoring rolls extending inwardly from both sides of the strips a distance of approximately one-third of the thickness of the strip. The center one-third of the edge is likewise smooth but presents the appearance of a clean sharp fracture, whereas the beveled parts of the edge have the appearance of polished rolled metal.

From the foregoing description of a preferred form of my invention, it will be evident that I have provided a method whereby strips of material can be rapidly and accurately cut into a plurality of narrow strips and whereby the cut edges of the strips are smooth and free from burrs. My machine for carrying out my method is of simple and sturdy construction, and by reason of the method of cutting employed the cutting edges of the scoring and shearing knives will retain their efficiency for long periods of time. Also my machine can be conveniently adapted for cutting strips of various widths and for cutting material of different thicknesses.

It will be evident that my method and my machine economically produce strips of material having novel and extremely useful characteristics in that the edge surfaces are smooth so that the strips can be used in the fabrication of various products without further treatment.

In the foregoing specification, I have described my method and machine as applied to cutting or slitting strips of steel. However, it will be evident to those skilled in the art that my invention can be applied to the cutting of other metals. Various modifications of my invention both as to the method and the machine and the strips produced thereby will be apparent to those skilled in the art. It is therefore to be understood that my invention is not limited to the preferred embodiment described herein, and that my patent is not limited by the foregoing detailed description or in any manner other than by the scope of the appended claims when given the range of equivalents to which my patent may be entitled.

I claim:

1. The method of slitting flat sheet metal which comprises cold rolling a sharp V-shaped groove of substantial depth in one side of the metal and thereafter displacing the metal on one side of the groove with respect to the metal on the other side of the groove by applying shearing forces on the flat surfaces of the metal adjacent the groove to a sufficient extent to cause the metal to be severed along the line of the groove.

2. The method of slitting sheet material which includes the steps of cold rolling aligned sharp V-shaped grooves in opposite sides of the metal while leaving sufficient metal between the grooves to prevent the metal from being completely separated, and thereafter shearing the metal along the line of the grooves by passing the metal between shearing rolls having peripheral surfaces spaced in a direction normal to the surface of the material and adapted to displace the metal on one side of the groove with respect to the metal on the other side of the groove.

3. The method of slitting sheet material which includes the steps of continuously passing the material while cold between rolls having axially aligned sharp V-shaped scoring knives adapted to form aligned V-shaped grooves in the surfaces of the metal to a depth substantially equal to one-third of the thickness of the metal and thereafter severing the metal along the line of the grooves by passing the metal between rolls having substantially cylindrical shearing knives thereon adapted to engage opposite surfaces of the metal on opposite sides of the line of the grooves and to apply a sufficient shearing force to the metal remaining between the grooves to sever the original strip into a plurality of strips, the shearing knives being spaced apart in a direction normal to the surface of the material.

4. In a machine for continuously slitting flat sheet metal, the combination of a pair of scoring rolls, sharp V-shaped scoring knives carried by the scoring rolls and adapted to cold roll aligned grooves on opposite sides of the metal, and a pair of shearing rolls having working surfaces spaced apart in a direction normal to the surface of the sheet metal adapted to shear the metal along the line of the grooves, and means for driving the scoring and shearing rolls at substantially the same lineal speed.

5. In a machine for continuously slitting sheet metal, the combination of a pair of scoring rolls, sharp V-shaped scoring knives carried by the scoring rolls and adapted to cold roll aligned grooves on opposite sides of the metal, a pair of shearing rolls having working surfaces spaced apart in a direction normal to the surface of the sheet metal adapted to shear the metal along the line of the grooves, a pair of pinch rolls for conveying the sheared metal from the machine, and means for driving the scoring rolls, shearing rolls and pinch rolls at substantially the same lineal speed.

6. In a machine for continuously slitting sheet metal, the combination of a pair of scoring rolls, sharp V-shaped scoring knives carried by the scoring rolls and adapted to cold roll aligned grooves on opposite sides of the metal, and a pair of shearing rolls adapted to shear the metal along the line of the grooves, a pair of pinch rolls for conveying the sheared metal from the machine, and means for axially adjusting said pinch rolls.

7. In a machine of the class described, the combination of a pair of scoring rolls provided with scoring knives adapted to roll substantially V-shaped grooves on opposite sides of a flat strip of metal passing through the machine, adjustable means for supporting said scoring rolls whereby the depth and alignment of the grooves formed by the rolls can be controlled, a pair of oppositely disposed spaced shearing rolls, shearing knives carried by said shearing rolls, and adjustable means for supporting said shearing rolls whereby said shearing rolls can be adjusted to engage the metal on opposite sides of the grooves produced by said scoring rolls to displace the metal on one side of said groove with respect to the metal on the other side of said grooves to a sufficient extent to sever the metal along the line of the grooves.

8. In a machine of the class described, the combination of a pair of scoring rolls adapted to roll aligned grooves on opposite sides of a flat strip of metal passing through the machine, adjustable means for supporting said scoring rolls whereby the depth and alignment of the grooves formed by the rolls can be controlled, a pair of shearing rolls having working surfaces spaced apart in a direction normal to the surface of the sheet metal mounted in said framework, and adjustable means for supporting said shearing rolls whereby said shearing rolls can be adjusted to engage the metal on opposite sides of the grooves produced by said scoring rolls to displace the metal on one side of said groove with respect to the metal on the other side of said grooves to a sufficient extent to sever the metal along the line of the grooves.

9. In a machine of the class described, the combination of a pair of scoring rolls provided with scoring knives adapted to roll grooves on opposite sides of a strip of thin sheet metal passing through the machine, adjustable means for supporting said scoring rolls whereby the depth and alignment of the grooves formed by the rolls can be controlled, a pair of shearing rolls mounted in said framework, the working surfaces of said shearing rolls being spaced apart in a direction normal to the surface of said strip of metal, adjustable means for supporting said shearing rolls whereby said shearing rolls can be adjusted to engage the metal on opposite sides of the grooves produced by said scoring rolls to displace the metal on one side of said groove with respect to the metal on the other side of said grooves to a sufficient extent to sever the metal along the line of the grooves, a pair of axially adjustable pinch rolls for conveying the severed metal from the machine, and means for driving said scoring rolls, shearing rolls and pinch rolls.

10. As an article of manufacture, a strip of sheet metal having a smooth edge having cold rolled beveled portions extending inwardly from the opposite surfaces of the strip distances approximately one-third of the thickness of the strip and having the central portion of the sheet between the bevels sheared off and presenting the appearance of a clean sharp fracture, the entire surface including the beveled and sheared portions being smooth and substantially free from burrs.

11. As an article of manufacture, a strip of sheet metal having a smooth edge having cold rolled beveled portions extending inwardly from the opposite surfaces of the strip and having the central portion of the sheet between the bevels sheared off and presenting the appearance of a clean sharp fracture, the entire surface including the beveled and sheared portions being smooth and substantially free from burrs.

WILLIAM W. LEACH.